United States Patent
Cardillo et al.

(10) Patent No.: US 7,324,939 B1
(45) Date of Patent: Jan. 29, 2008

(54) PHONETIC SEARCHING

(75) Inventors: Peter S. Cardillo, Atlanta, GA (US);
Mark A. Clements, Lilburn, GA (US);
William E. Price, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 122 days.

(21) Appl. No.: 11/341,311

(22) Filed: Jan. 27, 2006

Related U.S. Application Data

(62) Division of application No. 09/799,385, filed on Mar. 5, 2001.

(60) Provisional application No. 60/186,933, filed on Mar. 4, 2000.

(51) Int. Cl.
*G10L 15/00* (2006.01)

(52) U.S. Cl. ............... 704/236; 704/231; 704/249; 704/255

(58) Field of Classification Search ................ None
See application file for complete search history.

(56) References Cited

U.S. PATENT DOCUMENTS

| | | |
|---|---|---|
| 4,481,593 A | 11/1984 | Bahler |
| 4,802,231 A | 1/1989 | Davis |
| 4,896,358 A | 1/1990 | Bahler et al. |
| 5,023,911 A | 6/1991 | Gerson |
| 5,123,057 A | 6/1992 | Verly |
| 5,199,077 A | 3/1993 | Wilcox et al. |
| 5,218,668 A | 6/1993 | Higgins et al. |
| 5,333,275 A | 7/1994 | Wheatley |
| 5,406,423 A | 4/1995 | Sato |
| 5,440,662 A | 8/1995 | Sukkar |
| 5,440,730 A | 8/1995 | Elmasri et al. |
| 5,454,062 A | 9/1995 | La Rue |
| 5,483,586 A | 1/1996 | Sussman |
| 5,509,104 A | 4/1996 | Lee et al. |
| 5,526,444 A | 6/1996 | Kopec et al. |
| 5,535,256 A | 7/1996 | Maloney |
| 5,557,789 A | 9/1996 | Mase et al. |
| 5,621,849 A | 4/1997 | Sakurai et al. |
| 5,625,748 A | 4/1997 | McDonough |
| 5,638,489 A | 6/1997 | Tsuboka |

(Continued)

FOREIGN PATENT DOCUMENTS

EP 0177854 6/1989

(Continued)

OTHER PUBLICATIONS

"Boolean Basics for Search Engines," Reference Department Schwartz memorial Library, Long Island University, 1999.

(Continued)

*Primary Examiner*—V. Paul Harper
(74) *Attorney, Agent, or Firm*—Occhiuti Rohlicek & Tsao LLP

(57) ABSTRACT

An improved method and apparatus is disclosed which uses probabilistic techniques to map an input search string with a prestored audio file, and recognize certain portions of a search string phonetically. An improved interface is disclosed which permits users to input search strings, linguistics, phonetics, or a combination of both, and also allows logic functions to be specified by indicating how far separated specific phonemes are in time.

34 Claims, 2 Drawing Sheets

U.S. PATENT DOCUMENTS

| | | | |
|---|---|---|---|
| 5,649,057 A | 7/1997 | Lee et al. |
| 5,649,060 A | 7/1997 | Ellozy |
| 5,701,153 A | 12/1997 | Reichek |
| 5,701,452 A | 12/1997 | Siefert |
| 5,732,394 A | 3/1998 | Nakadai et al. |
| 5,748,840 A | 5/1998 | La Rue |
| 5,787,414 A | 7/1998 | Miike et al. |
| 5,794,194 A | 8/1998 | Takebayashi et al. |
| 5,797,123 A | 8/1998 | Chou et al. |
| 5,822,405 A | 10/1998 | Astarabadi |
| 5,822,409 A | 10/1998 | Chang et al. |
| 5,822,729 A | 10/1998 | Glass |
| 5,832,430 A | 11/1998 | Lleida et al. |
| 5,842,163 A | 11/1998 | Weintraub |
| 5,884,259 A | 3/1999 | Bahl |
| 5,884,262 A | 3/1999 | Wise et al. |
| 5,895,464 A | 4/1999 | Bhandari et al. |
| 5,909,662 A | 6/1999 | Yamazaki et al. |
| 5,918,222 A | 6/1999 | Fukui et al. |
| 5,918,223 A | 6/1999 | Blum et al. |
| 5,950,159 A | 9/1999 | Knill |
| 6,023,659 A | 2/2000 | Seilhamer et al. |
| 6,023,675 A | 2/2000 | Bennett |
| 6,023,677 A | 2/2000 | Class et al. |
| 6,023,726 A | 2/2000 | Saksena |
| 6,061,652 A | 5/2000 | Tsuboka |
| 6,073,095 A | 6/2000 | Dharanipragada et al. |
| 6,185,527 B1 | 2/2001 | Petovic et al. |
| 6,185,531 B1 | 2/2001 | Schwartz |
| 6,253,178 B1 | 6/2001 | Robillard et al. |
| 6,260,011 B1 | 7/2001 | Heckerman et al. |
| 6,263,049 B1 | 7/2001 | Kuhn |
| 6,317,710 B1 | 11/2001 | Huang et al. |
| 6,345,252 B1 | 2/2002 | Beigi |
| 6,345,253 B1 | 2/2002 | Viswanathan |
| 6,404,856 B1 | 6/2002 | Wilcox |
| 6,408,064 B1 | 6/2002 | Fedorov |
| 6,408,270 B1 | 6/2002 | Garber |
| 6,411,683 B1 | 6/2002 | Goldberg |
| 6,434,520 B1 | 8/2002 | Kanevsky et al. |
| 6,466,906 B2 | 10/2002 | Erell |
| 6,505,153 B1 | 1/2003 | Van Thong |
| 6,539,353 B1 | 3/2003 | Jiang |
| 6,542,602 B1 | 4/2003 | Elazar |
| 6,603,854 B1 | 8/2003 | Judkins |
| 6,668,256 B1 | 12/2003 | Lynch |
| 7,113,910 B1 | 9/2006 | Pereira et al. |
| 2001/0040942 A1 | 11/2001 | Glowny |
| 2001/0049601 A1 | 12/2001 | Kroeker |
| 2002/0051522 A1 | 5/2002 | Merrow |
| 2002/0052870 A1 | 5/2002 | Charlesworth et al. |
| 2002/0143544 A1 | 10/2002 | Gschwendtner |
| 2002/0161570 A1 | 10/2002 | Loofbourrow |
| 2005/0216443 A1 | 9/2005 | Morton et al. |

FOREIGN PATENT DOCUMENTS

| | | |
|---|---|---|
| EP | 0398574 | 11/1990 |
| EP | 833498 | 4/1998 |
| EP | 877378 | 11/1998 |
| WO | WO 02/05135 | 1/2002 |

OTHER PUBLICATIONS

Barnwell et al., "Speech Coding: A Computer Laboratory Textbook," John Wiley & Sons, Inc. 1996.

Divay et al., "Algorithms for grapheme-phoneme translation for English and French: Applications for Database Searches and Speech Synthesis," 1997 Computational Linguistics, 23(4), pp. 495-523.

Hauptmann et al., "Text, Speech, and Vision for Video Segmentation: The Informedia Project," AAAI, Fall 1995, pp. 1-6.

Moreno et al., "A recursive algorithm for the forced alignment of very long audio segments," ICSLP-1998, pp. 1-4.

Frakes et al., "Information Retrieval Data Structures & Algorithms," Prentice-Hall, 1992, ISBN 0-13-463837-9, pp. 264-268.

Li et al., "MOQL: A Multimedia Object Query Language," third International Workshop on Multimedia Information Systems, Como, Italy, Sep. 1996.

Foote et. Al., "Unconstrained keyword spotting using phone lattices with application to spoken document retrieval," Computer Speech and Language, vol. 11, No. 3, Jul. 1997, pp. 207-224.

Gelin et al., "Keyword spotting for multimedia document indexing," Multimedia storage and chiving systems II, vol. 3229, Nov. 3, 1997, pp. 366-377.

Kadambe et al., "Language identification with phonological lexical models," 1995 International Conference on Acoustics Speech, and Signal Procesing, ICASSP-95, vol. 5, May 9, 1995, pp. 3507-3510.

Politis et al., "An audio signatures indexing scheme for dynamic content multimedia databases," 10$^{th}$ Mediterranean Electrotechnical Conference 2000, vol. 2, May 29, 2000, pp. 725-728.

Hunt et al., "Unit selection in a concatenative speech synthesis stem using a large speech database," Proc. ICASSP, May 1996.

Lee, "Content-Dependent Phonetic Hidden Markov Models for Speaker-Independent Continuation Speech Recognition," IEEE Transactions on Acoustics, Speech and Signal Processing; Apr. 1990; pp. 347-362.

Bacchiani et al., "SCANMail: Audio Navigation in the Voicemail Domain," Jan. 9, 2001.

Brown et al., "Toward speech as a knowledge resource," IBM Systems Journal, vol. 40, No. 4, 2001.

Cooper et al., "SAMSA: A Speech Analysis, Mining and Summary Application for Outbound Telephone Calls," Proc. 34$^{th}$ Hawaii International Conference on System Science, 2001.

Kubala, "TDT in Oasis in Tides Portal," Feb. 28, 2000.

Rabiner, "A Tutorial on Hidden Markov Models and Selected Applications in Speech Recognition," Proc. IEEE, vol. 77, No. 2, Feb. 1989.

Van Thong et al., "SpeechBot: A Speech Recognition based Audio Indexing System for the Web," International Conference on Computer-Assisted Information Retrieval, (RIAO2000), Paris, Apr. 2000; pp. 106-115.

Witbrock et al., "Speech Recognition for a Digital Video Library," Journal of the American Society of Information Science, vol. 49, No. 7, pp. 619-632, 1998.

Abberley, et al. "Retrieval of Broadcast News Documents With The Thisl System," Proc. IEEE ICASSP'98, pp. 3781-3784 (1998).

Brown, et al. "Open Vocabulary Speech Indexing For Voice and Video Mail Retrieval," Proc. of ACM Multimedia pp. 307-316 (1996).

Choi et al. "SCAN—Speech Content based Audio Navigator: A systems overview," Proc. ICSLP'98 (1998).

Deshmukh, et al. "Automated Generation of N-Best Pronunciations of Proper Nouns," Proc. IEEE ICASSP'96 pp. 283-286 (1996).

Makhoul et al., "Speech and Language Technologies for Audio Indexing and Retrieval," Proc. IEEE, 88(8), pp. 13381353 (2000).

Abberley, et al. "Retrieval of Broadcast News Documents With The Thisl System," *Proc. IEEE ICASSP'98*, pp. 3781-3784 (1998).

Abberley, et al. "The Thisl Broadcast News Retrieval System," *ESCA ETRW Workshop on Accessing Information in Spoken Audio* (1999).

Abberley, et al. "The THISL SDR system at TREC-8," *In Proceedings of the 8th Text Retrieval Conference (TREC-8)*. (1999).

Alvarez-Cercadillo, et al. "Context Modeling Using RNN For Keyword Protection," *Proc. IEEE ICASSP'93* vol. I: pp. 569-572 (1993).

Bahl, et al. "Maximum Mutual Information Estimation of Hidden Markov Model Parameters for Speech Recognition," *Proc. IEEE ICASSP'86*, vol. I: pp. 49-52 (1986).

Bakis "Spoken Word Spotting via Centisecond Acoustic States," *IBM Technical Disclosure Bulletin* 18(10) (1976).

Boreczky et al. "A Hidden Markov Model Framework for Video Segmentation Using Audio and Image Features," *Proc. ICASSP'98* (1998).

Bourlard, et al. "Optimizing Recognition and Rejection Performance in Wordspotting Systems," *Proc. IEEE ICASSP'94* vol. 1: pp. 373-376.

Brown, et al. "Open Vocabulary Speech Indexing For Voice and Video Mail Retreival," *Proc. of ACM Multimedia* pp. 307-316 (1996).

Chang, et al. "High-Performance Low-Complexity Wordspotting Using Neural Networks," *IEEE Trans. Signal Processing*, vol. 45 No. 11 pp. 2864-2870 (1997).

Chang, et al. "Improving Wordspotting Performance With Artificially Generated Data," *Proc. IEEE ICASSP'96*vol. 1: pp. 526-529 (1996).

Choi et al. "SCAN—Speech Content based Audio Navigator: A systems overview," *Proc. ICSLP'98* (1998).

Choi, et al. "An Overview of the AT&T Spoken Document Retrieval," *DARPA/NIST Broadcast News Transcription and Understanding Workshop* (1998).

Cooper, et al. "Building Searchable Collections of Enterprise Speech Data,".

Deshmukh, et al. "Automated Generation of N-Best Pronunciations of Proper Nouns," *Proc. IEEE ICASSP'96* pp. 283-286 (1996).

deVries "Radio and Television Information Filtering through Speech Recognition,".

Dharanipragada, et al "A Fast Vocabulary Independent Algorithm For Spotting Words in Speech," *Proc. IEEE ICASSP'98*, pp. 233-236 (1998).

Dharanipragada, et al. "Audio-Indexing For Broadcasting News," *Proceedings of TREC6* (1997).

Dharanipragada, et al. "New Word Detection in Audio-Indexing," *Proc 1997 Workshop on Automatic Speech Recognition and Understanding*, pp. 551-557 (1997).

Dharanipragada, et al. "Experimental Results in Audio Indexing," *Proceedings of TREC6* (1997).

Foote, et al. "An Overview of Audio Information Retrieval," *ACM-Springer Multimedia Systems* (1998).

Garofolo et al., "The TREC Spoken Document Retrieval Track: A Success Story," *Proc. TREC-8*, pp. (2000).

Gelin, et al. "Keyword Spotting for Video Soundtrack Indexing," *Proc. IEEE ICASSP'96* vol. 1: pp. 299-302 (1996).

Higgins, et al. "Keyword Recognition Using template Concatenation," *Proc. IEEE ICASSP'85*, vol. III: pp. 1233-1236 (1985).

Hirschberg, et al. "Finding Information In Audio: A New Paradigm For Audio Browsing and Retrieval," *In Proceeding of the ESCA ETRW Workshop* (1999).

Hofstetter, et al. "Techniques for Task Independent Word Spotting In Continuous Speech Messages," *Proc. IEEE ICASSP'92*, vol. II: pp. 101-104 (1992).

Huang et al. "A Fast Algorithm for Large Vocabulary Keyword Spotting Application," *Proc. IEEE Trans. On Speech and Audio Proc.*, 2(3) (1994).

International Search Report from PCT/US2004/23676.

Itoh, et al. "Sentence Spotting Applied to Partieal Sentences and Unknown Words," Proc. IEEE ICASSP'94 pp. I-369-I-372 (1994).

James "A System For Unrestricted Topic Retrieval From Radio News Broadcasts," *Proc. IEEE ICASSP'96* pp, 279-282 (1996).

James, et al. "A Fast Lattice-Based Approach to Vocabulary Independent Wordspotting," *Proc. ICASSP* vol. 1: pp. 377-380 (1994).

Jeanrenaud et al. "Phonetic-based Word Spotter: Various Configurations and Applications to Event Spotting." Proc. ESCA Eurospeech'93, vol. II, pp. 1057-1060 (1993).

Jeanrenaud, et al. "Spotting Events in Continuous Speech," *Proc. IEEE ICASSP'94*, vol. I: pp. 381-384 (1994).

Johnson et al. "The Cambridge University Spoken Document Retrieval System," *Proc. IEEE ICASSP'99* (1999).

Jones, et al. "Robust Talker-Independent Audio Document Retrieval," *Proc. IEEE ICASSP'96*, pp. 311-314 (1996).

Jones, et al. "Video Mail Retrieval: The Effect of Word Spotting Accuracy on Precision," *Proc. IEEE ICASSP'95* pp. 309-312 (1995).

Junkawitsch, et al. "A New Keyword Algorithm With Pre-Calculated Optimal Thresholds," Proc. *ICSLP'96*, pp. 2067-2070 (1996).

Kimber, "Speaker Segmentation for Browsing Recorded Audio," *Proc. ACM CHI'95* (1995).

Knill, et al. "Fast Implementaiton Methods for Viterbi-Based Word Spotting," *Proc. IEEE ICASSP'96* (1996).

Knill, et al. "Speaker Dependent Keyword Spotting for Accessing Stored Speech," *Technical Report CUED/F-INFENG/TR 193* (1994).

Kosonocky, et al. "A Continuous Density Neural Tree Network Word Spotting System," *Proc. IEEE ICASSP'95* vol. I: pp. 305-308 (1995).

Kuhn "On Talker-Independent Word Recognition in Continuous Speech," *Proc. IEEE ICASSP'82* vol. III: pp. 1612-1615 (1982).

Kuhn, et al. "Approaches to Phoneme-Based Topic Spotting: An Experimental Comparison," *Proc. IEEE ICASSP'97*, vol. 3: pp. 1819-1822 (1997).

Lee, et al. "Speaker-Independent Phone Recognition Using Hidden Markov Models," *IEEE Trans. Acoustics Speech and Signal Proc.*, vol. 37(11).pp. 1641-2648 (1989).

Li, et al. "A Whole Word Recurrent Neural Netword For Keyword Spotting," *Proc. IEEE ICASSP'92* vol. 2: pp. 81-84 (1992).

Lippmann, et al. "Hybrid Neural-Network/HMM Approaches to Wordspotting," *Proc. IEEE ICASSP'93* vol. 1: pp. 565-568 (1993).

Lippmann, et al. "Wordspotter Training Using Figure-of-Merit Back Propagation," *Proc. IEEE ICASSP'94* vol. I: pp. 389-392 (1994).

Makhoul et al., "Speech and Language Technologies for Audio Indexing and Retrieval," *Proc. IEEE*, 88(8), pp. 1338-1353 (2000).

Manos, et al "A Segment-Based Wordspotter Using Phonetic Filler Models," *Proc. IEEE ICASSP'97*, pp. 899-902 (1997).

Marcus "A Novel Algorithm for HMM Word Spotting, Performance Evaluation and Error Analysis," *Proc. IEEE ICASSP'92* pp. 89-92 (1992).

Medress et al. "An Automatic Word Spotting System for Conversational Speech," *Proc. IEEE ICASSP'78* (1978).

Meliani, et al. "Accurate Keyword Spotting Using Strictly Lexical Fillers" *Proc. IEEE ICASSP'97*, pp. 907-910 (1997).

Meliani, et al. "New Efficient Fillers for Unlimited Word Recognition and Keyword Spotting," Proc. *ICSLP'96* vol. 2: pp. 590-593 (1996).

Miller et al. "BBn at TREC7: using Hidden markov Models for Information Retrieval," *The 7th Text Retrieval Conference, TREC-7* (1999).

Morgan, et al. "A Keyword Spotter Which Incorporates Neural Networks for Secondary Processing," *Proc. IEEE ICASSP'90*, pp. 113-116 (1990).

Morgan, et al. "Multiple Neural Network Topologies Applied to Keyword Spotting," *Proc. IEEE ICASSP'91* pp. 313-316 (1991).

Nakagawa, et al. "On Quick Word Spotting Techniques," *Proc. IEEE ICASSP'86*, vol. III: pp. 2311-2314 (1986).

Naylor, et al. "Neural Network Word/False-Alarm Discriminators For Improved Keyword Spotting," *Proc. IJCNN'92*, vol. 2 pp. 296-301 (1992).

Naylor, et al. "The Application of Neural Networks to Wordspotting," *Proc. 26th Asilomar Conference on Signals, Systems and Computers* vol. 2: pp. 1081-1085 (1992).

Ng, et al. "Phonetic Recognition For Spoken Document Retrieval," *Proc. IEEE ICASSP'98* pp. 325-328 (1998).

Ozeki, et al. "Likelihood Normalization Using an Ergodic HMM For Continuous Speech Recognition," *Proc. ICSLP'96* vol. 4: p. 2301-2304 (1996).

Renals, et al. "Efficient Search Using Posterior Phone Probability Estimates," *Proc. IEEE ICASSP'95*, pp. 596-599 (1995).

Rohlicek et al. "Continuous Hidden Markov Modeling for Speaker-Independent Word Spotting," *Proc. IEEE ICASSP'89* pp. 627-630 (1989).

Rohlicek, "Word Spotting," in *Modern Methods of Speech Processing*, Ramachandran and Mammone (eds) Kluwer (1995).

Rohlicek, et al. "Phonetic Training and Language Modeling for Word Spotting," *Proc. IEEE ICASSP'93*, vol. II: pp. 459-462 (1993).

Rose, "Techniques for Information Retrieval from Speech Messages," *Lincoln Laboratory Journal*, vol. 4(1) (1991).

Rose, et al. "Task Independent Wordspotting Using Decision re Based All Phone Clustering," *Proc. IEEE ICASSP'93*, vol. 2: pp. 467-470 (1993).

Rose, et al. "A Hidden Markov Model Based Keyword Recognition System," *Proc. IEEE ICASSP'90*, vol. 1: pp. 129-132 (1990).

Rose, et al. "Discriminating Wordspotting Techniques For Rejecting Non-Vocabulary Utterances in Unconstrained Speech," *Proc. IEEE ICASSP'92*, vol. II: pp. 105-108 (1992).

Rose, et al. "Techniques for Information Retrieval from Voice Messages," *Proc. IEEE ICASSP'91*, pp. 317-320 (1991).

Roy, et al. "Audio Meeting History Tool: Interactive Graphical User-Support for Virtual Audio Meetings," *Proceedings of ESCA Workshop on Accessing Information in Spoken Audio*, pp. 107-110 (1999).

Roy, et al. "Speaker Identification Based Text to Audio Alignment For An Audio Retrieval System," *Proc. of the Int. Conf. Acoustics, Speech and Signal Processing* vol. 2: pp. 1099-1103 (1997).

Ruan, et al. "Applying Neural Network to Robust Keyword Spotting in Speech Recognition," *Proc. IEEE ICNN'95*, vol. 5: pp. 2882-2886 (1995).

Sarukkai et al. "Phonetic Set Indexing for Fast Lexical Access," *IEEE Trans. on Pattern Analysis and Machine Intelligence*, vol. 20: pp. 79-82 (1998).

Smeaton, "Indexing, Browsing and Searching of Digital Video and Digital Audio Information." *Tutorial Notes, European Summer School in Information Retrieval*, Varenna, Lago di Como, Italy, 2000.

Suhardi, et al "Wordspotting Using a Predictive Neural Model for the Telephone Speech Corpus," *Proc. IEEE ICASSP'97*, vol. 2 pp. 915-918 (1997).

Van Leeuwen, et al. "Prediction of Keyword Spotting Performance Based on Phonemic Contents."

Vroomen et al. "Robust Speaker-Independent Hidden Markov Model Based Word Spotter," in *Speech Recognition and Understanding: Recent Advances*, Laface and DeMori (eds), Springer-Verlag (1992).

Waibel, et al. "Phoneme Recognition Using Time-Delay Neural Networks," *IEEE Trans. Acoustics Speech and Signal Proc.*, vol. 37, No. 3: pp. 328-339 (1989).

Weintraub "Keyword-Spotting Using SRI's Decipher Large-Vocabulary Speech-Recognition System," *Proc. IEEE ICASSP'93* vol. II: pp. 463-466 (1993).

Weintraub "LVCSR Log-Likelihood Ratio Scoring for Keyword Spotting," *Proc. IEEE ICASSP'95* vol. 1 pp. 297-299 (1995).

Wilcox et al, "Annotation and Segmentation in Multimedia Indexing and Retrieval" 1998.

Wilcox et al. "HMM-based Wordspotting for Voice Editing and Indexing," *Proc. Eurospeech 91*, pp. 25-28 (1991).

Wilcox, et al. "Wordspotting For Voice Editing and Audio Indexing," *Proc. ACM CHI'92*, pp. 655-666 (1992).

Wilcox, et al. "Training and Search Algorithms For an Interactive Wordspotting System," *Proc. IEEE ICASSP'92*, vol. II: pp. 97-100 (1992).

Wilpon, et al. "Application of Hidden Markov Models for Recognition of a Limited Set of Words in Unconstrained Speech," *Proc. IEEE ICASSP'89*, pp. 254-257 (1989).

Wilpon, et al. "Automatic Recognition of Keywords in Unconstrained Speech Using Hidden Markov Models," *IEEE Trans. Acoustics Speech and Signal Proc.*, vol. 38 No. 11, pp. 1870-1878 (1990).

Wilpon, et al. "Improvements and Applications for Key Word Recognition Using Hidden Markov Modeling Techniques," *Proc. IEEE ICASSP'91*, pp. 309-312 (1991).

Wohlford, et al. "The Enhancement of Wordspotting," *Proc. IEEE ICASSP'80*, pp. 209-212 (1980).

Yonezawa, et al. "Modeling of Contextual Effects and its Application to Word Spotting," *Proc. ICSLP'96* vol. 4: pp. 2063-2064 (1996).

Young, et al. "Acoustic Indexing for Multimedia Retrieval and Browsing" *Proc. IEEE ICASSP'97* vol. 1 pp. 199-202 (1997).

|     | 1 | 2 |   |   |   |   | 121 |
| --- | --- | --- | --- | --- | --- | --- | --- |
| O1 | $B_1$ | $B_2$ | $B_3$ | = = = = = | = = = | = = = | $B_{1,121}$ |
| O2 | $B_{2,1}$ | $B_{2,2}$ | $B_{2,3}$ | = = = = = | = = = | = = = | $B_{2,121}$ ← 251 |
| O3 | = = = = | = = = = | = = = = | = = = = = | = = = | = = = | = = = = ← 252 |
|     | = = = = | = = = = | = = = = | = = = = = | = = = | = = = | = = = = |
| O4 | = = = = | = = = = | = = = = | = = = = = | = = = | = = = | = = = = |
| O5 | = = = = | = = = = | = = = = | = = = = = | = = = | = = = | = = = = |
| O6 | = = = = | = = = = | = = = = | = = = = = | = = = | = = = | = = = = |

FIG. 2

PHONETIC SEARCHING

RELATED APPLICATION

This application is a divisional application of U.S. application Ser. No. 09/799,385, filed Mar. 5, 2001, which claims priority to U.S. Provisional Application No. 60/186,933 filed on Mar. 4, 2000. The prior applications are incorporated herein by reference.

TECHNICAL FIELD

This invention relates to processing of audio files, and more specifically, to an improved technique of searching audio and textual strings.

BACKGROUND OF THE INVENTION

Stored documents and audio files may be searched in a wide variety of business situations. The user may wish to search a video recording for specific topics, or may wish to search a textual file. Textual searching may be done, for example, for the purpose of reviewing long transcripts and other such items. Typically, search strings are entered by a user and the search string is compared to a stored file. When a match is found, an indication of such is conveyed to the user.

With regard to textual searching, one problem is that misspellings will not be matched. More specifically, if the search string spells a word differently from the way that the word appears in the document, the searching software would usually not find the word in the document. With regard to audio searching, the signal processing is usually extremely complex. This means that unless one employs a super high speed and expensive computer, the searching cannot be done in a reasonable time frame, and certainly cannot be accomplished in many times faster than real time. Thus, it is impractical to search a substantial size file of audio in a user interactive manner. Further, because speech to text algorithms are subject to error, prior known searching algorithms based on the textual output of a speech to text system are typically unreliable.

Still another issue is the use of "hard decisions" in audio searching. Specifically, in most prior systems, a threshold is set that represents a degree of similarity. If the search string and the file being searched meet the threshold, then a "match" is declared. These hard decisions are not optimum in audio searching, due to the large number of variables in search strings, particularly if such search strings are input in audio form themselves.

Another issue which has hindered the potential uses of audio searching software is the fact that the user interfaces are typically unreliable or cumbersome. More specifically, the user would typically interface with the system using a boolean searching strategy, which often requires that commands be spelled correctly. While the user may instruct the system to look for words within a certain "distance" of each other, such "distance" is usually specified by a number of words, sentences, or paragraphs. For example, a user may instruct a system to look for the word "take-off" in the same sentence as the word "airplane". However, phonetic searching operates by sounds on actual audio signals, not by sentences. Thus, it is difficult for the software to accurately determine when items are in the same sentence, within three words of each other, etc.

In view of the foregoing, there exists a need in the art for an improved user interface and phonetic searching system that can provide high speed, search results.

There is also a need for a system that can provide a user-friendly and flexible interface into a phonetic and textual searching system.

There also exists a need for a better system of logic functionality for permitting a user to input items for searching in a textual or audio file.

There is still a further need in the art for a system that can search audio files thousands of times faster than real time.

SUMMARY OF THE INVENTION

The above and other problems of the prior art are overcome in accordance with the present invention. A first aspect of the invention relates to permitting a user to input searching criteria and command a software system to process an input search string against a prestored file that may be either of the audio type or the textual type. In a preferred embodiment, the user inputs words and the system determines whether each word in the input search string is a phonetic spelling or a linguistic spelling. Thus, the user may use "mix and match" in the input string. Other embodiments include allowing the user to specify distances between words by time, and/or by number of words and sentences.

The user is also permitted to input search strings to be used against a textual file, which will be converted to a phonetic description, and searched phonetically. In such a case, the search string may be input linguistically, phonetically, or via audio.

An algorithm is also disclosed for performing the phonetic searching. The preferred embodiment of the algorithm eliminates any hard decisions, and instead calculates a set of probabilities indicating where in the file the search string is likely to be, ranking such results preferably in order of increasing or decreasing probability. The algorithm preferably utilizes a stored probably matrix that includes rows representing time frames of the stored file, and columns representative of various phoneme states.

The foregoing and other advantages of the present invention will become apparent as the following description of the preferred embodiment and drawings are reviewed.

BRIEF DESCRIPTION OF THE DRAWINGS

FIG. 2 shows an exemplary matrix utilized in accordance with the present invention.

DETAILED DESCRIPTION OF THE PREFERRED EMBODIMENT

Figure 1:
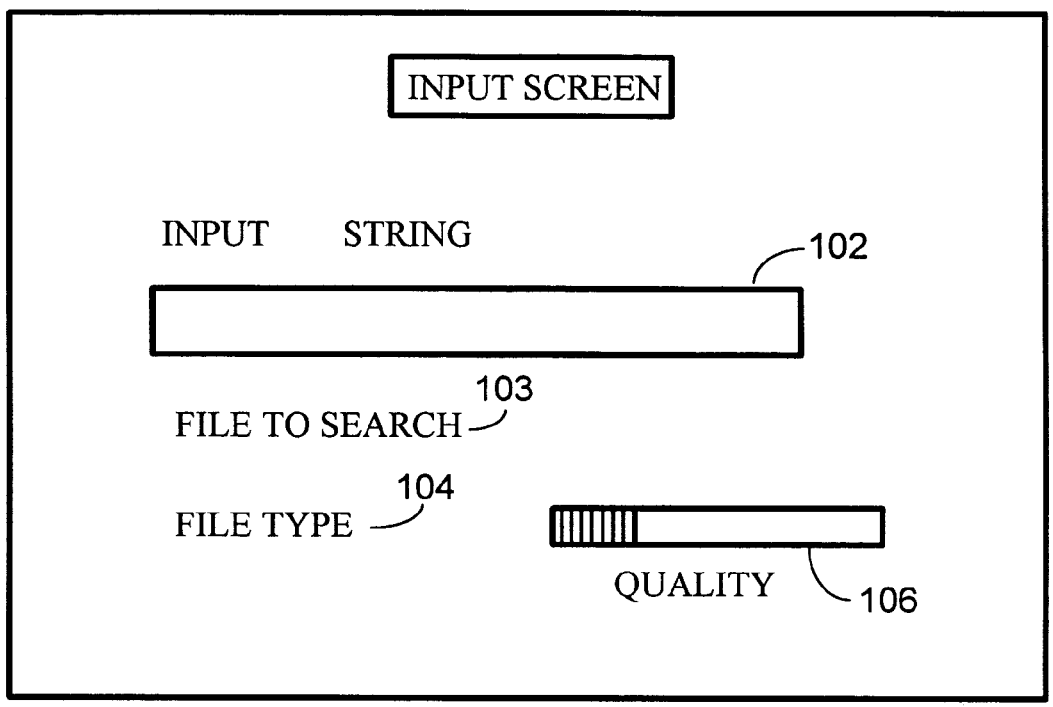
FIG. 1 shows an exemplary input screen to interfacing to the system.

FIG. 1 shows an exemplary input screen, which may be utilized by the user in order to interface to the system. The figure includes an input string entry field 102, a file identification field 103, and a file type field 104. Other examples of an input screen may be utilized as well, and the invention is not limited to the simplistic exemplary input screen shown in FIG. 1.

Returning to FIG. 1, the input string may be entered using a variety of techniques. One technique is that the input string may be entered using a fully linguistic technique. For example, consider a lengthy file and a user desiring to search for the sentence "The rain in Spain falls mainly on the plane." The search string may be input by a user simply entering the correctly spelled text. However, the search string may also be input utilizing boolean logic wherein the connectors represent different distances. For example, the user may instruct the software to search for the term "rain" within the same sentence, or within ten words of the term "mainly". Moreover, the "distance" specified may be in the form of time. The user may input a search string that attempts to locate occurrences of the term "rain" within two seconds of the term "Spain".

The above techniques may be mixed and matched as the system implementer desires and as the particular system dictates. Thus, for example, the user may input a search string seeking to find occurrences of the term "rain" within two seconds of the term "Spain", all in the same sentence as the word "plane." Other variations are also possible.

Regardless of which such input method is used to enter the search string, all of the terms may be converted to phonetic representation prior to performing the search. The file to be searched is also either an audio file, or a text file that has been concerted to a phonetic transcription.

In the event that the user does not know how to spell one or more words or phrases, part of the search string may be input in phonetic form. Thus, for example, a user can input a search string by specifying "The rain in Spain [FAOLZ] mainly on the plane". The term [FAOLZ] is a phonetic representation of "falls." The deliminators signify a phonetic representation. This would permit the system to search for the appropriate string even though only a portion of the string is spelled correctly. The user may also input word or nonsense utterance whose pronunciation using letter-to-sound rules approximate that of the target.

Notably, a novel aspect of the invention therefore, comprises converting the input string into phonetics by searching the input string to ascertain which words are entered linguistically, and which words have been entered phonetically. A text to speech program can then be utilized to convert the linguistically entered words into phonetics, while the phonetically entered words are converted by simply generating the phonemes. Any words that are misspelled linguistically will be detected via their absence from a dictionary. The spelling can then be corrected using standard techniques known and used in word processors, and the correct linguistically entered word ascertained and converted to phonetics. In another embodiment, the system could process correctly spelled words linguistically, and could presume that incorrectly spelled words are phonetically entered. Notably, even if the incorrect word is ascertained, as long as the ascertained word is phonetically similar to the desired word, then the phonetic searching described herein will operate substantially correctly.

Thus, a search string may be entered that specifies phonetically or linguistically which terms are to be located, and which specifies distances between items in the search string by either words, paragraphs, etc. or by time. The search string may even be entered in a manner that separates words by number of phonemes, although such a technique is less user-friendly and thus less desirable. The ability to specify search items in such a manner provides the most flexibility to a user, and represents an advance over fixed input type of systems.

In still another embodiment, the input string may itself be entered by voice commands. The voice commands are then placed through a speech recognition algorithm and are turned into a sequence of phonemes for phonetic searching. The algorithm to convert the voice string into the phonemes may be a commercially available such algorithm, or may utilize the technology described later herein.

File to search field 103 permits a user to specify whether the search is being performed on a text or an audio file. In the case of a text file, the system may convert such text first to a phonetic transcription. Note that the software may determine automatically from the examination of the file whether the file to be searched is an audio file or a text file. However, in the case where two files have the same name, it would be desirable to specify which file should be searched, either the audio or the textual. For phonetic searching, the file may be preprocessed in accordance with the algorithm described hereafter.

A quality meter 106 is also part of the user interface. The quality meter gives the user an indication of how accurate the search results are likely to be based upon the input search string being entered. The "quality" would usually increase as the number of words increases. Moreover, given the probabilistic nature of the search, and the lack of hard decisions, the longer and more unique the search string is, the more accurate the results. The quality meter includes an indicator that moves from a predetermined minimum to a predetermined maximum in order to indicate how "good" the input search string is.

The quality meter may be calibrated empirically by measuring the quality of results achieved with search strings of different lengths. Alternatively, the quality of the search may be related to any parameter of the string via empirical calculations. Thus, the quality may be related to the number of vowels in the search string, the number of separate words, or any other parameter. The system designer is free to pick any parameter that characterizes the search string, vary the values through a range, and then utilize changes in the accuracy of the result to calibrate the quality meter correctly.

Once calibrated, the quality meter determines that a particular search string is 50%, or 80%, or 90% accurate. The user may then keep lengthening and changing the search string until an acceptable quality is reached.

The algorithm for performing the search is essentially a matrix of phonemes, wherein one dimension of the matrix represents time frames of an audio file to be searched, and a second dimension of the matrix represents the 40 phonemes and a "bridge" state, representing the state between words. The second dimension actually includes 121 values, since each of the forty phonemes includes three states, and the "bridge" state is one additional state.

In order to maximize the speed of searching the stored audio file, a novel-searching algorithm, is disclosed. In the exemplary embodiment, multiple Gaussian mixtures are utilized to model a vector of 39 features, the features being comprised of 13 Mel Frequency Cepstral Coefficients (MFCC's) along with a first and second derivative for each. The models are then used to compute $b_s(O_t)$ for all states s, $1 \leq s \leq S$, where S is the number of states, and observation symbols $O_t$ at all time frames t, as specified in Rabiner Equation (8). The possible states are chosen from the 121 states, 120 of which represent 3 states of 40 phonemes, and one of which is a "bridge" state as described below. The model utilized is one of several standard models used to train in the well-known Balm Welch training algorithm.

In addition to being utilized to calculate $b_s(O_t)$ for all states and time frames, the models also contain state transition probabilities $a_{jk}$ as defined in Rabiner Equation (7). The transition probabilities $a_{jk}$ represent the probability that the signal will transition to a state k the next time frame if it is currently in state j. These transition probabilities can be ascertained using the Baum Welch algorithm as described in Rabiner III-C or other ways known in the art.

During pre-processing of the stored audio file, a matrix is constructed, wherein rows of the matrix represent time frames of an audio file, and columns of the matrix represent different possible states. Each entry in the matrix is the likelihood of the feature vector for a specified phoneme at a specified time as denoted $b_s(O_t)$, or more accurately, during a specified time frame. A representation of such a matrix is depicted in FIG. 2.

Preferably, each of these probabilities is quantized with a four-bit log linear quantizer producing a quantized score. The score for each phoneme state is stored for every frame. In a preferred embodiment, the frame is 32 milliseconds long, and overlapping frames are calculated every 10 ms. Thus, with reference to FIG. 2, if row 251 represents a particular 32 ms time slice from time X to time X+32 ms, then row 252 would represent a slice of time beginning at time X+10 ms and ending at time X+42 ms. The preprocessing of the stored audio signal, prior to searching, provides a significant speed increase in that it minimizes the processing requirements during searching. The output of the preprocessing step includes a matrix of probabilities as shown in FIG. 2, with each entry of the matrix representing the probability $b_k(O_t)$ as defined earlier that the signal is in that state at that time.

In addition to the foregoing preprocessing, a forward variable score for the bridge state $\alpha_1(\text{bridge})$ as described in Rabiner, equations (19) and (20), for all frames is calculated. Conceptually, this represents the probability that the system is entering the bridge state, given the signal history starting from the beginning of the signal and moving forward. It attempts to calculate the probability that, of the plural possible different paths through all of the possible states that the signal could take, it in fact took a path that would put it into the bridge state during this particular frame. This forward variable score $\alpha_1(\text{bridge})$ is calculated for each frame (i.e., row) in the matrix of FIG. 2. Preferably, it is stored using sixteen bit quantized values, but the invention of course is not limited thereto.

The next step in the preprocessing, is to calculate and store $P(O|\lambda)$, as described in Rabiner, eqn. (21). O represents all of the speech feature vectors $O_0 \ldots O_T$. The variable $\lambda$ stands for the entire HMM network and acoustical models that were calculated when the speech signal was modeled according to the multiple guassian models and the Baum Welch training algorithm as previously described. Conceptually, the term P represents the probability that the input speech signal was produced by the acoustical model used to model the speech. Techniques and software for calculating P are known in the art.

The next step in the preprocessing stage is to calculate the backwards probability, $\beta_1(\text{bridge})$, as described in Appendix B eqn. (24) and (25) for all frames. This represents the probability that the signal is in the bridge state given the history looking backwards. In other words, starting from the end of the signal and working toward the beginning, as the frames are traversed, $\beta_t(\text{bridge})$ represents the probability that the signal has traversed a path of states that leads it into the bridge state at time t. This probability then must be multiplied by the acoustical probability that the signal is in the bridge state at time t, based upon the Guassian models previously described.

Next, we observe that the probability that a phoneme having its last state as state n ends in a particular time frame t can therefore be represented as $$\Gamma_t^n = [\beta_{t+1}(\text{bridge})] b_{bridge}(O_{t+1})][a_{n,bridge}]$$

where $b_{bridge}(O_{t+1})$ is the acoustical probability of the bridge state given the feature vector from frame t+1. In other words, $b_{bridge}(O_{t+1})$ is the 121$^{st}$ column of the matrix shown in FIG. 2 during the time frame t+b 1.

The $a_{n,bridge}$ represents the transition probability from state n to the bridge state. State n is chosen to be the last state of the last phoneme of the search phrase, and thus depends on the search string. Nonetheless, the portion of the $\Gamma_t^{(n)}$ for each of the time frames that is represented by the first two factors of the right side of the above equation is all known in advance of the entry of the search string, and can be calculated during preprocessing. When the search string is entered, the calculation of the $\Gamma_t^{(n)}$ can be completed, yielding a set of variables that represent the probability that the system has moved from the bridge state at time t, given $O_{t+1}$, $O_{t+2}, \ldots, O_T$ and its audio characteristics during time t.

After completing the foregoing preprocessing, the system will seek to find, during searching, for each time frame, the probability that the signal, moving backwards in time, goes from the bridge state to the state that is the last state of the search string. In other words, this represents the probability that the search string ended during a time frame in the prestored audio file.

In the search stage, a command may be given by a user to find a specified key word or phrase in the audio. The command may be given utilizing one of the exemplary user interfaces described herein, or another exemplary user interface. Once converted to phonetics, the goal now is to compare the search string to the preprocessed information and to ascertain, for each time frame in the matrix of FIG. 2, the probability that the search string ended during that frame.

In furtherance of the above, the system needs to ascertain, as best as possible, what the state of the search string is at the time the string ends. In other words, the system attempts to ascertain the last state of the last phoneme of the search string. It then compares this last state to the stored preprocessed audio file in order to find the 32 ms frames that have the maximum probability that the last state of the search string occurred during said frame.

More specifically, the search string is processed initially to obtain a probability that the search string is in state k at a time frame of −1. This is initialized by setting $\alpha_{-1}(k)=0$ for all states (i.e., for all ks).

The variable $\alpha_t(k)$ as defined in Rabiner Equation (18), is the forward variable probability that the search string is the kth state during time frame t. For each time frame greater than −1, the probability that the search string traversed a sequence of states to arrive at a state k is calculated as follows:

For k=1, which is the first state in the search string:

$$\alpha_{t+1}(1) = [\alpha_t(\text{bridge}) a_{bridge,1} + \alpha_t(1) a_{11}] b_1(O_{t+1})$$

For k>1 and up through n, the following applies:

$$\alpha_{t+1}(k) = [\alpha_t(k-1) a_{k-1,k} + \alpha_t(k) a_{kk}] b_k(O_{t+1}), 2 \leq k \leq n, 0 \leq t \leq T$$

Wherein $b_n(O_{t+1})$ is the entry of the matrix of FIG. 2 appearing in the nth column, t+1 row. The transition probabilities $a_{jk}$ were previously calculated during the initial phase that modeled the signal.

Notably, any states not contained in the search string correspond to columns of the matrix of FIG. 2 that need not be processed. Thus, much of the matrix of FIG. 2 need not be loaded during searching, or equivalently, much of the matrix may be discarded prior to processing the search string. This technique saves significant processing resources, and results in a much faster search.

Intuitively, the foregoing attempts to calculate the probability that the input signal has traversed a path defined by a set of states. For each time frame and each state, the above calculates the probability that the signal was in that state and stayed in that state, and adds it to the probability that the signal was in the prior state and moved to the state in question. The equation above for the first state is slightly different, because the first state was entered from the bridge state.

The system then can find the time frame in the stored audio file at which the search phrase is most likely to have ended by calculating the probability that the path of the search string through all possible states goes from state n, the last state of the search phrase, to the bridge state, during time frame t. The following equation yields such a result:

$$P''_t(\text{keyword}) = \frac{\alpha_t(n)\Gamma_t(n)}{P(O|\lambda)} a_{n,5}$$

where $\lambda$ is defined in Rabiner Equation (11)

The system computes the above equation for each of the time frames t, which represent the probabilities that the search string ended within a particular time frame. These probabilities are then sorted and preferably displayed in descending order. The result is a list of the time frames, in descending order of probability, during which it is most likely that the search phrase ended.

In essence, the algorithm is determining the probability that the searched for phrase ended during a particular time t. The algorithm may then output the set of probabilities, with the corresponding time t, in decreasing order. This can represent a decreasing ordered list of the most probable times that the searched for phrase appears in the stored audio signal.

It will be readily appreciated by those of skill in the art that the foregoing algorithm need not be limited to searching for the time frame in which a key phrase or word ends. By simply reversing the time order of the foregoing equations, which are set up to search for the end of a word, the algorithm may search for the beginning of a word. Moreover, after the particular time frames in which the beginning or end of the word occurs are ranked by probability value, the audio may be played back to a user. Preferably, the list of time frames would be displayed on the screen, and the user can select particular time frames. Once the time frame is selected, the system should preferably begin playing back the audio from the stored audio textual file from a few words, seconds, or sentences prior to the selected time frame, so that the user can see the context of the phrase.

We note that the term "Phonetic", as used herein, is given its ordinary meaning. That is, it is meant to define the format used by most common dictionaries. The use of a phonetic search string provides more user flexibility because the user need not know the correct spellings of each word.

There is however, still another type of search string contemplated by the present invention, which is sometimes referred to as phonetic but which is different from the ordinary phonetic. We term this additional type of search string a "sounds like" phonetic search string. An example will help illustrate. Take the word "caterpillar". A phonetic spelling is kat'er pil'er. A sounds like phonetic spelling would be "cat are pill or", which, although not strictly phonetic, represents still another manner in which search strings may be put in. Different deliminaters or other characters may be used to designate, for each term or sound in the input phrase, whether the term or sound is being entered linguistically, phonetically, or using sounds like phonetically. In such a manner, any combination of two or three of the foregoing techniques may be used depending upon user preferences.

While the foregoing describes the preferred embodiments of the invention, it will be appreciated that various other modifications or additions will be apparent to those of skill in the art. Such modifications or additions are intended to be covered by the following claims.

What is claimed is:

1. A method for finding a desired audio event in an audio signal comprising:
   accepting audio data representing a recording of the audio signal in a recording interval having a beginning and an end, wherein a first end time comprises a time of one of the beginning and the end of the recording interval and a second end time comprises a time of the other of the beginning and the end;
   preprocessing the audio data, including
      computing preprocessing data associated with each of a series of times in the recording interval, including computing preprocessing data that include scores associated with each of the times based on the audio signal between said each of the series of times and the first end time of the recording interval, and
      storing said preprocessing data;
   determining a representation of the desired audio event; and
   searching the audio signal for the desired audio event, including
      computing scores for each of the series of times in the recording interval based on the representation of the desired audio event and associated with the audio signal between said each of the series of times and the second end time of the recording interval,
      retrieving the stored preprocessing data, and
      combining the scores based on the representation of the desired audio event and scores from the retrieved preprocessing data to form scores for the desired audio event each associated with a different time in the recording interval.

2. The method of claim 1 further comprising finding occurrences of the desired audio event based on the scores for said events.

3. The method of claim 1 wherein finding occurrences of the desired audio event based on the scores for said events includes ranking times in the recording interval according to the scores for the desired audio event at said times.

4. The method of claim 1 wherein computing the preprocessing data is performed independently of the desired audio event.

5. The method of claim 4 wherein computing the preprocessing data is performed prior to determining the representation of the desired audio event.

6. The method of claim 1 wherein computing the preprocessing data includes computing scores associated with each of a series of equally spaced times.

7. The method of claim 6 wherein the equally spaced times are spaced at intervals of 10 milliseconds.

8. The method of claim 1 wherein the first end time is earlier than the second end time in the recording interval.

9. The method of claim 1 wherein computing the preprocessing data includes computing probabilities of model states associated with each of said times.

10. The method of claim 1 wherein computing preprocessing data associated with each of the series of times in the recording interval further includes computing preprocessing data that includes scores associated with each of the series of times based on the audio signal between said time and the second end time of the recording interval.

11. The method of claim 10 wherein computing preprocessing data that includes scores associated with each of the series of times based on the audio signal between said time and the second end time of the recording interval includes computing a probability associated with each time.

12. The method of claim 1 wherein computing the preprocessing data further includes computing preprocessing data associated with each time and associated with each of a plurality of model states based on the audio signal in the vicinity of said time.

13. The method of claim 12 wherein computing preprocessing data associated with each time and associated with each of the plurality of model states includes computing a quantity associated with a likelihood of observing the audio signal in the vicinity of said time in each of the model states.

14. The method of claim 1 wherein preprocessing the audio data includes quantizing the computed data before storing said data.

15. The method of claim 1 wherein the computing the preprocessing data includes processing the audio data using a hidden Markov model.

16. The method of claim 15 wherein the hidden Markov model includes phonetic models.

17. The method of claim 15 wherein computing the preprocessing data associated with a time based on the audio signal between said time and the first end time of the recording interval includes computing a probability of observing the audio signal between said time and the first end time according to the hidden Markov model.

18. The method of claim 17 wherein computing a probability of observing the audio signal between said time and the first end time according to the hidden Markov model includes computing a probability of observing said audio signal and occupying a state of the model that is associated with an endpoint of the desired audio event.

19. The method of claim 17 wherein the computing the preprocessing data includes applying a recursive computation for successive of the times of the series of times in the recording interval.

20. The method of claim 1 wherein determining a representation of the desired audio event includes determining a phonetic representation of the desired audio event.

21. The method of claim 20 wherein determining a representation of the desired audio event includes accepting a text representation.

22. The method of claim 21 wherein accepting the text representation includes accepting one or more words.

23. The method of claim 22 wherein accepting words includes accepting a phrase.

24. The method of claim 21 wherein accepting the text representation includes accepting text representation of a pronunciation.

25. The method of claim 21 wherein accepting the text representation of a pronunciation includes accepting a representation in terms of phonetic units.

26. The method of claim 20 wherein determining a representation of the desired audio event includes accepting an audio signal.

27. The method of claim 26 wherein accepting the audio signal includes accepting data encoding a spoken word.

28. The method of claim 1 wherein determining a representation of the desired audio event includes determining a representation of multiple components of the desired audio event, and characteristics of a desired temporal relationship of the components.

29. The method of claim 28 wherein determining a representation of multiple components includes determining a phonetic representation of each of the components.

30. The method of claim 28 wherein determining characteristics of a desired temporal relationship of the components includes determining a maximum temporal separation of said components.

31. A method for finding a desired audio event in an audio signal comprising:
preprocessing the audio signal independently of the desired audio event, including
computing preprocessing data associated with each of a series of times in a recording interval, including computing preprocessing data that include scores associated with each of the series of times and associated with different model states, and
storing said preprocessing data; and
accepting a representation of the desired audio event;
searching the audio signal for the desired audio event, including
retrieving the scores from the stored preprocessing data,
computing scores using the accepted representation of the desired event, and
computing scores for occurrences at corresponding times of the desired audio event by combining the retrieved scores and scores computed using the accepted representation of the desired event.

32. The method of claim 31 wherein computing preprocessing data that include scores associated with each of the times and associated with different model states includes computing scores associated with phonetic models.

33. The method of claim 31 wherein computing scores for occurrences of the desired audio event includes evaluating an expression for a quantity characterizing a probability of occurrence of the desired audio event, wherein the expression includes a first term determined from the scores of the preprocessing data and second term determined using the representation of the desired audio event.

34. The method of claim 31 wherein the computing of the preprocessing data requires substantially more computation than the computing of the scores using the accepted representation of the desired event.

* * * * *